(12) United States Patent
Gima

(10) Patent No.: US 11,330,677 B2
(45) Date of Patent: May 10, 2022

(54) LAMINATED GLASS

(71) Applicant: AGC INC., Tokyo (JP)

(72) Inventor: Yuhei Gima, Tokyo (JP)

(73) Assignee: AGC INC., Tokyo (JP)

( * ) Notice: Subject to any disclaimer, the term of this patent is extended or adjusted under 35 U.S.C. 154(b) by 299 days.

(21) Appl. No.: 16/352,710

(22) Filed: Mar. 13, 2019

(65) Prior Publication Data

US 2019/0297679 A1 Sep. 26, 2019

(30) Foreign Application Priority Data

Mar. 23, 2018 (JP) .............................. JP2018-056738

(51) Int. Cl.
*B60L 1/02* (2006.01)
*H05B 3/84* (2006.01)
*H05B 3/20* (2006.01)

(52) U.S. Cl.
CPC .................................... *H05B 3/84* (2013.01); *H05B 3/20* (2013.01)

(58) Field of Classification Search
CPC ... H05B 3/20; H05B 3/22; H05B 3/26; H05B 3/68; H05B 3/74; H05B 3/748; H05B 3/84; H05B 3/845; H05B 3/86; H05B 2203/00; H05B 2203/002; H05B 2203/009; H05B 2203/011; H05B 2203/013; H05B 2203/016; H05B 2203/031
USPC .................. 219/202–203, 214, 522, 538–548
See application file for complete search history.

(56) References Cited

U.S. PATENT DOCUMENTS

| 4,102,722 | A | * | 7/1978 | Shoop | B32B 17/10018 156/99 |
| 4,703,328 | A | * | 10/1987 | Jones | H01Q 1/1278 219/203 |
| 2004/0214016 | A1 | * | 10/2004 | Adachi | C03C 8/18 428/432 |
| 2008/0035629 | A1 | * | 2/2008 | Thiry | B32B 17/10036 219/203 |
| 2010/0252545 | A1 | * | 10/2010 | Weiss | H05B 3/84 219/203 |
| 2011/0108537 | A1 | * | 5/2011 | Schall | B32B 17/1077 219/201 |
| 2020/0316917 | A1 | * | 10/2020 | Ogawa | B32B 17/10385 |

FOREIGN PATENT DOCUMENTS

| JP | H06-318492 A | 11/1994 |
| JP | H08-072674 A | 3/1996 |
| JP | 2011-210487 A | 10/2011 |
| JP | 2016-128370 A | 7/2016 |

* cited by examiner

*Primary Examiner* — Sang Y Paik
(74) *Attorney, Agent, or Firm* — Foley & Lardner LLP

(57) ABSTRACT

The laminated glass comprises a pair of glass plates, a pair of intermediate layers located between the pair of glass plates and being in contact, respectively, with the glass plates and a substrate located between the intermediate layers and provided with an electrically conductive heated material, wherein a first bus bar, which is connected to the electrically conductive heated material, is arranged along at a left end of the substrate; a second bus bar, which is connected to the electrically conductive heated material is arranged along at a right end of the substrate, and a third bus bar is disposed as superimposed on at least a part of the region of at least one bus bar among the first and second bus bars.

19 Claims, 11 Drawing Sheets

LAMINATED GLASS

CROSS-REFERENCE TO RELATED PATENT APPLICATION

The present application is based on and claims priority under 35 U.S.C. § 119 of Japanese Patent Application No. 2018-056738 filed on Mar. 23, 2018. The content of the application is incorporated herein by reference in its entirety.

TECHNICAL FIELD

The present invention relates to laminated glass provided with an electrically conductive heated material.

BACKGROUND ART

As window glass for an automobile or railway vehicle, it is known to apply laminated glass (also called electrically heated window glass or electrically heated glass) having an electrically conductive heated material (such as a plurality of resistive heating wires) sandwiched between a pair of glass plates. By this laminated glass, it is possible to dissipate fog from window glass or to resolve freezing of moisture attached to window glass in winter, by letting the electrically conductive heated material generate heat.

Such laminated glass is usually constituted by a pair of glass plates, an intermediate resin layer sandwiched between the pair of glass plates, a first bus bar provided at one end between the pair of glass plates, a second bus bar provided at the other end between the pair of glass plates, and an electrically conductive heated material provided between the first bus bar and the second bus bar. This electrically conductive heated material is arranged at a see-through region excluding the periphery of the laminated glass.

Here, as the laminated glass provided with an electrically conductive heated material, one wherein an intermediate layer having a thin resistive heating wire made of tungsten embedded therein, is arranged between a pair of glass plates (e.g. Patent Document 1), one having a transparent electrically conductive coating layer formed on glass (e.g. Patent Document 2), or one wherein a pattern sheet having an electrically conductive pattern provided on a substrate, is arranged between a pair of glass plates (Patent Document 3), is known. Further, as the electrically conductive heated material, one having an electrically conductive portion formed on a transparent film substrate (Patent Document 4) is known.

PRIOR ART DOCUMENTS

Patent Documents

Patent Document 1: JP-A-H8-72674
Patent Document 2: JP-A-H6-318492
Patent Document 3: JP-A-2016-128370
Patent Document 4: JP-A-2011-210487

DISCLOSURE OF INVENTION

Technical Problem

In the conventional laminated glass provided with an electrically conductive heated material, a low resistance metal is employed for the first bus bar and the second bus bar in order to sufficiently secure the calorific value of the electrically conductive heated material arranged at a see-through region of the glass plates.

Usually, the first bus bar and the second bus bar are, from the viewpoint of designability of outer appearance, arranged to be concealed by an optically shielding portion (e.g. black ceramics layer) formed along the periphery of the glass plate, but along with improvement of the designability in recent years, the width of the optically shielding portion tends to be thin. If the width of the optically shielding portion becomes thin, the width of the first bus bar and the second bus bar is also obliged to be made thin. Therefore, the resistance value at the first bus bar and the second bus bar tends to increase, and the heat generation loss at the first bus bar and the second bus bar tends to increase, whereby there has been a problem that the heat generation efficiency of the electrically conductive heated material tends to decrease.

The present invention has been made in view of the above circumstances and has an object to provide laminated glass capable of improving the heat generation efficiency of the electrically conductive heated material, while suppressing heat generation at the first bus bar and the second bus bar.

Solution to Problem

In order to accomplish the object of the present invention, the laminated glass of the present invention comprises a pair of glass plates facing each other, an intermediate layer located between the pair of glass plates and sandwiched between the pair of glass plates, and a substrate located between the pair of glass plates and having an electrically conductive heated material at least on one main surface, wherein the substrate has a first end and a second end opposing the first end; a first bus bar is connected to the electrically conductive heated material is arranged along the first end; a second bus bar is connected to the electrically conductive heated material is arranged along the second end; and a third bus bar is arranged as overlapped on at least a part of the region of at least one bus bar among the first and second bus bars.

Advantageous Effects of Invention

According to the present invention, it is possible to improve the heat generation efficiency of the electrically conductive heated material, while suppressing heat generation at the first bus bar and the second bus bar.

DESCRIPTION OF EMBODIMENTS

Now, with reference to the attached drawings, preferred embodiments of the laminated glass according to the present invention will be described. Here, in the following drawings, with respect to the same or similar components, description will be made by using the same reference symbols, and in the case of overlapping, the description may be omitted.

Figure 1:
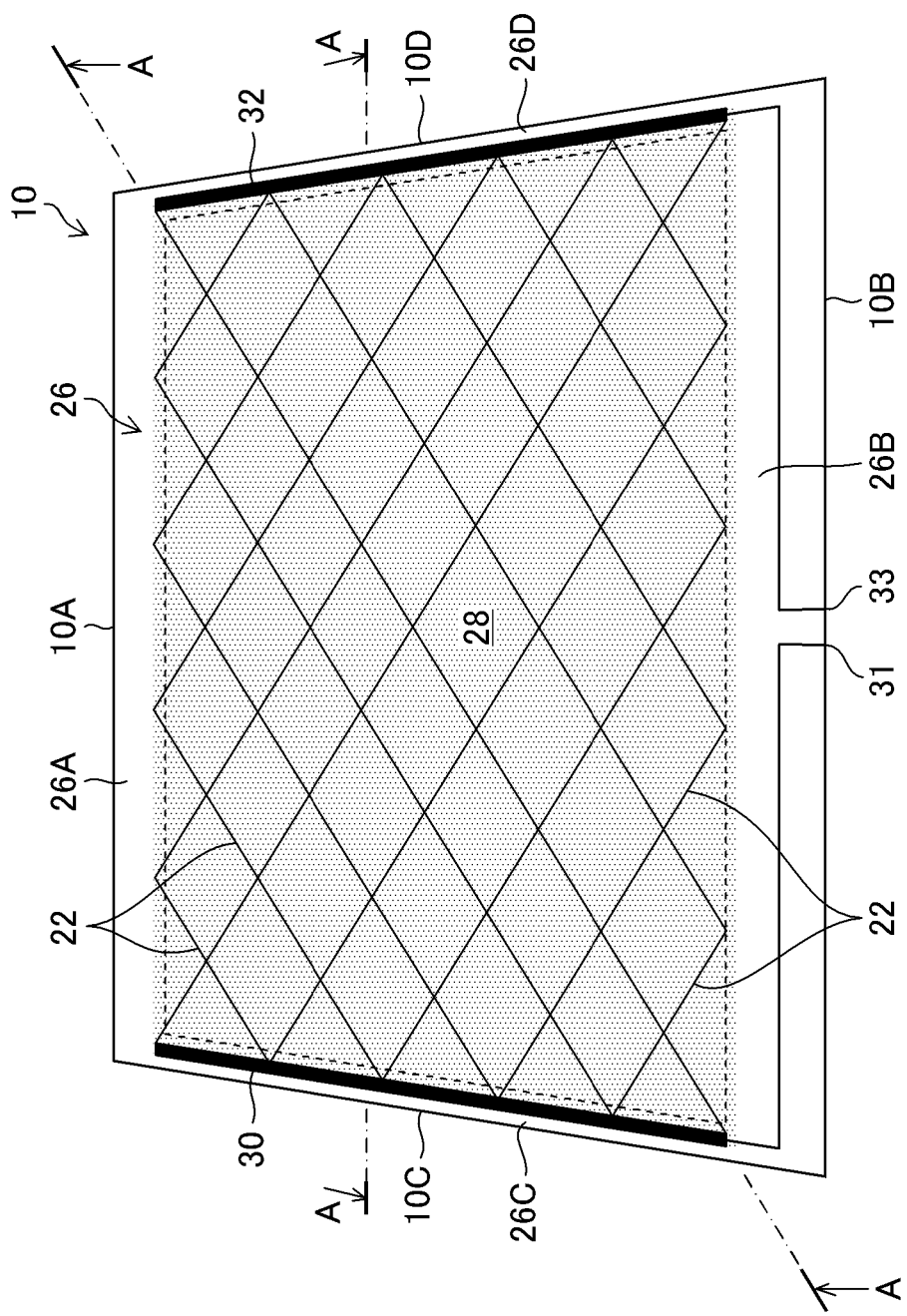
FIG. 1 is a front view of laminated glass in an embodiment to be applied to a front glass of an automobile.

In order to describe the characteristics of the present invention to be easily understandable, laminated glass 10 in FIG. 1 is shown flatly by eliminating the real curved shape. Here, in the following description, symbol 10A represents the upper edge of the laminated glass 10; symbol 10B represents the lower edge; symbol 10C represents the left edge; and symbol 10D represents the right edge. Here, in a case where the laminated glass 10 is attached to a right steering wheel vehicle, the upper edge refers to the roof side edge of the vehicle; the lower edge refers to the engine room side edge; the left edge refers to the passenger's seat side edge; and the right edge refers to the driver's seat side edge.

Figure 2:
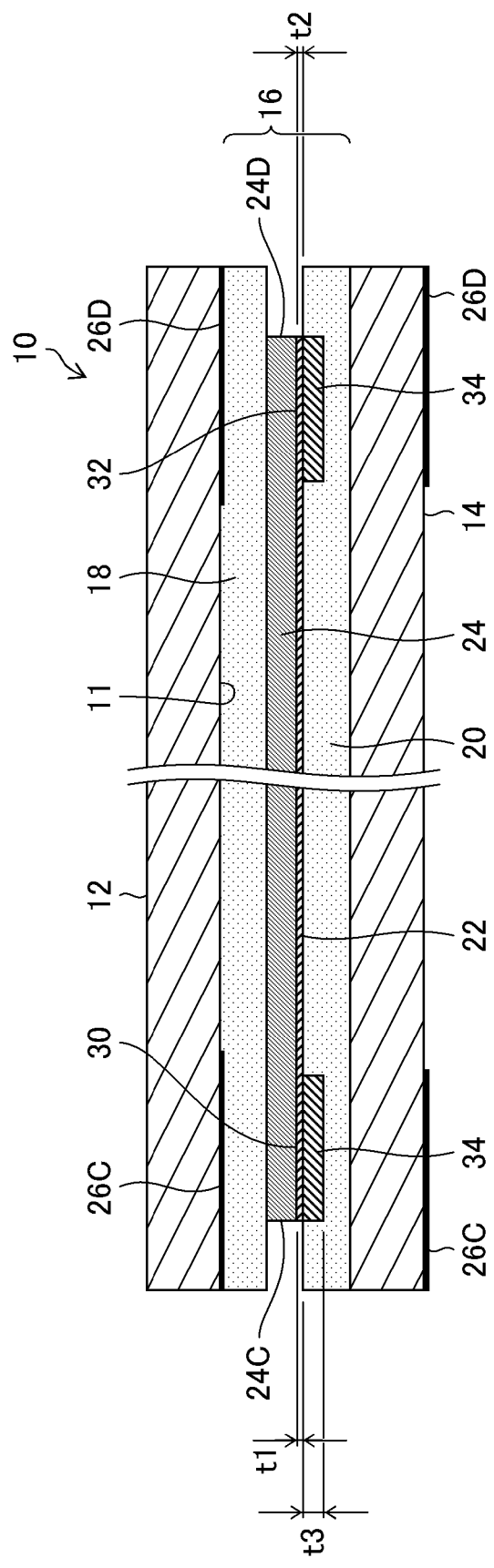
FIG. 2 is a cross-sectional view along line A-A of the laminated glass shown in FIG. 1.

FIG. 2 is a cross-sectional view along line A-A of the laminated glass 10 shown in FIG. 1, and is a cross-sectional view having part of the construction omitted.

As shown in FIG. 2, the laminated glass 10 in this embodiment comprises a pair of glass plates 12, 14 facing each other and an intermediate material 16 located between the pair of glass plates 12, 14. This intermediate material 16 comprises a pair of intermediate layers 18, 20 sandwiched between the pair of glass plates 12, 14, and a substrate 24 having an electrically conductive heated material 22 on one main surface.

The pair of Intermediate layers 18, 20 are located between the pair of glass plates 12, 14; the intermediate layer 18 is in contact with the glass plate 12; and the intermediate layer 20 is in contact with the glass plate 14. The substrate 24 is located between the pair of glass plates 12, 14 and is located between the pair of intermediate layers 18, 20.

In the following description, description will be made on such a basis that at the time when the laminated glass 10 is fixed to an opening of a vehicle, the glass plate 12 shown in FIG. 2 is disposed on the outside of the vehicle, and the glass plate 14 is disposed on the inside of the vehicle.

In the laminated glass 10, a strip-shaped optically shielding portion 26 is provided along the periphery (the upper edge 10A, the lower edge 10B, the left edge 100, the right edge 10D) in FIG. 1. This optically shielding portion 26 (26C, 26D) is usually provided only on the inner surface side of the glass plate 14 as shown in FIG. 2, in many cases, but in a case where bus bars and electrodes are provided like in an electrical heating glass, in order to hide them, the optically shielding portion may be provided also on the inside surface 11 of the glass plate 12.

As the optically shielding portion 26, a dark colored opaque hiding layer so-called "black colored ceramics layer" may, for example, be exemplified. This optically shielding portion 26 may be formed by applying a black colored ceramics printing ink on the inside surface 11 of the glass plate 12, followed by baking it, but may be formed by other known processes. By the optically shielding portion 26 thus formed, a dark colored opaque layer is formed on each side of the laminated glass 10, and by such a dark colored opaque layer, deterioration by ultraviolet rays, of a resin such as urethane which holds the laminated glass 10 along each side, is prevented.

Figure 3:
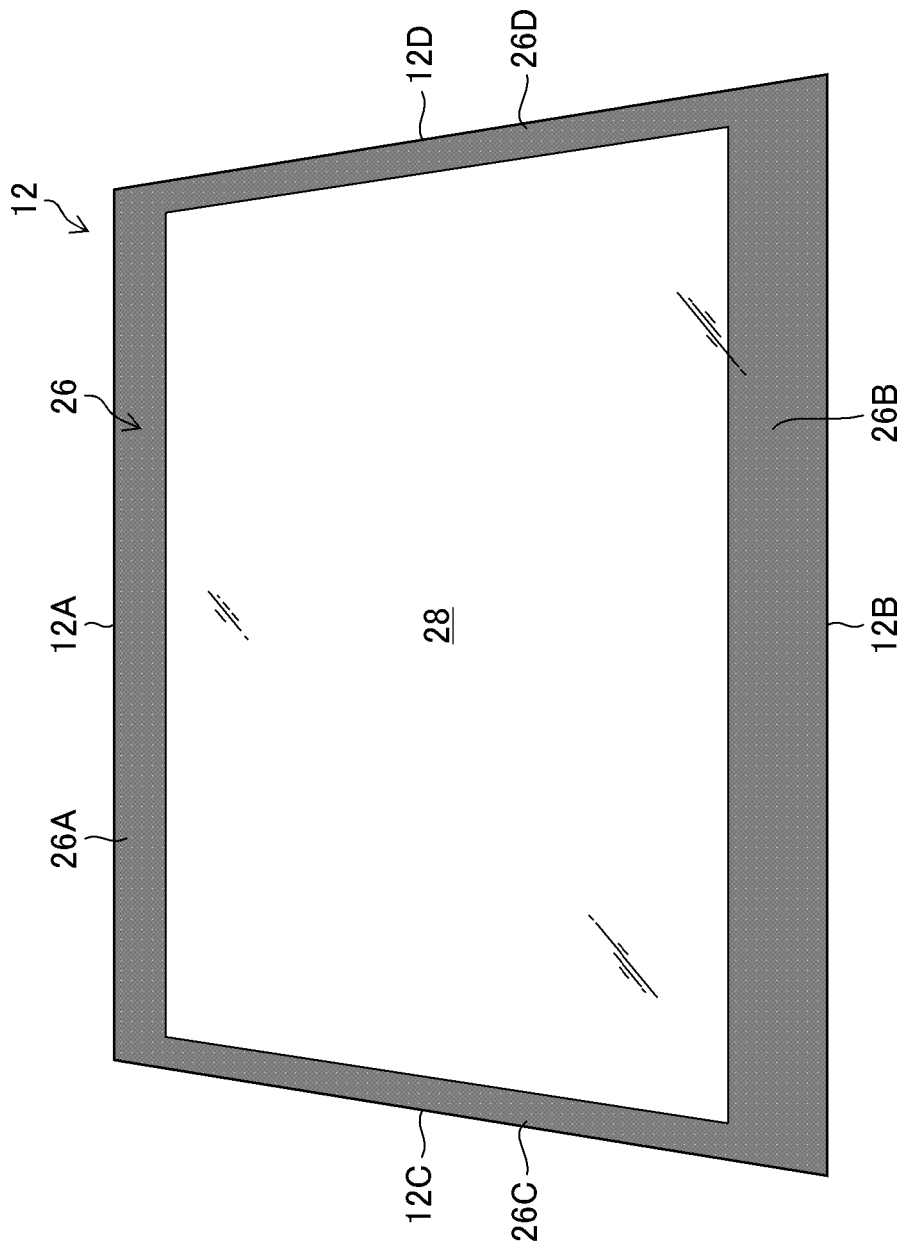
FIG. 3 is a front view of the glass plate to be disposed on the outside of the vehicle, of the laminated glass.

FIG. 3 is a front view of the glass plate 12 and is one which particularly shows the region forming the optically shielding portion 26. From the viewpoint of widening the visual field at right and left of the laminated glass, the optically shielding portion 26 is formed so that optically shielding portions 26C, 26D formed along the left edge 12C and right edge 12D of the glass plate 12 become to be thinner in width than optically shielding portions 26A, 26B formed along the upper edge 12A and lower edge 12B of the glass plate 12. Here, in the laminated glass, the trapezoidal region surrounded by the optically shielding portions 26A, 26B, 26C and 26D is a see-through region 28, and at this see-through region 28, the electrically conductive heated material 22 in FIG. 1 is arranged.

As shown in FIG. 2, the substrate 24 to constitute the intermediate material 16 is a transparent sheet material having a surface area slightly small as compared with the surface area of the glass plates 12, 14. Further, the substrate 24 has a left end 24C and a right end 24D. Further, although not shown in FIG. 2, the substrate 24 has an upper end and a lower end. Here, the left end 24C corresponds to the first end in the present invention, and the right end 24D corresponds to the second end in the present invention.

At the left end 24C of the substrate 24, a first bus bar 30 to be electrically connected to the electrically conductive heated material 22 is arranged along the left end 24C (see FIG. 1). And, at the right end 24D of the substrate 24, a second bus bar 32 to be electrically connected to the electrically conductive heated material 22 is arranged along the right end 24D (see FIG. 1).

Further, in the laminated glass 10 in this embodiment, a third bus bar 34 is arranged as overlapped on each of the first bus bar 30 and the second bus bar 32. According to the laminated glass 10 in this embodiment, as it is provided with the third bus bars 34, the following effects are obtainable.

Since the third bus bar 34 is overlapped on each of the first bus bar 30 and the second bus bar 32, the resistance values of the first bus bar 30 and the second bus bar 32 can be made smaller to an extent corresponding to the cross-sectional area of the third bus bar 34. Thus, even if the current flowing in the first bus bar 30 and the second bus bar 32 increases as the heat generation amount of the electrically conductive heated material becomes large, it is possible to suppress the heat generation loss at the first bus bar 30 and the second bus bar 32. Accordingly, according to the laminated glass 10 in this embodiment, it is possible to sufficiently exhibit the defogging and defreezing performances at the see-through region, which is the primary purpose of heating.

Further, the first bus bar 30 and the second bus bar 32 are, as shown in FIG. 1, arranged so that they are hidden by the optically shielding portions 26D, 26C formed on the glass plate 12. At that time, along with improvement of designability of window glass such as front glass, once the width of the optically shielding portions 26C, 26D is made thin, the width of the first bus bar 30 and the second bus bar 32 is obliged to be also made thin. Therefore, the resistance value of the first bus bar 30 and the second bus bar 32 becomes to be large. However, according to the laminated glass 10 in this embodiment, since the third bus bar 34 is overlapped on each of the first bus bar 30 and the second bus bar 32, even if the width of the first bus bar 30 and the second bus bar 32 is made thin, it is possible to make their resistance value to be small.

Figure 4:
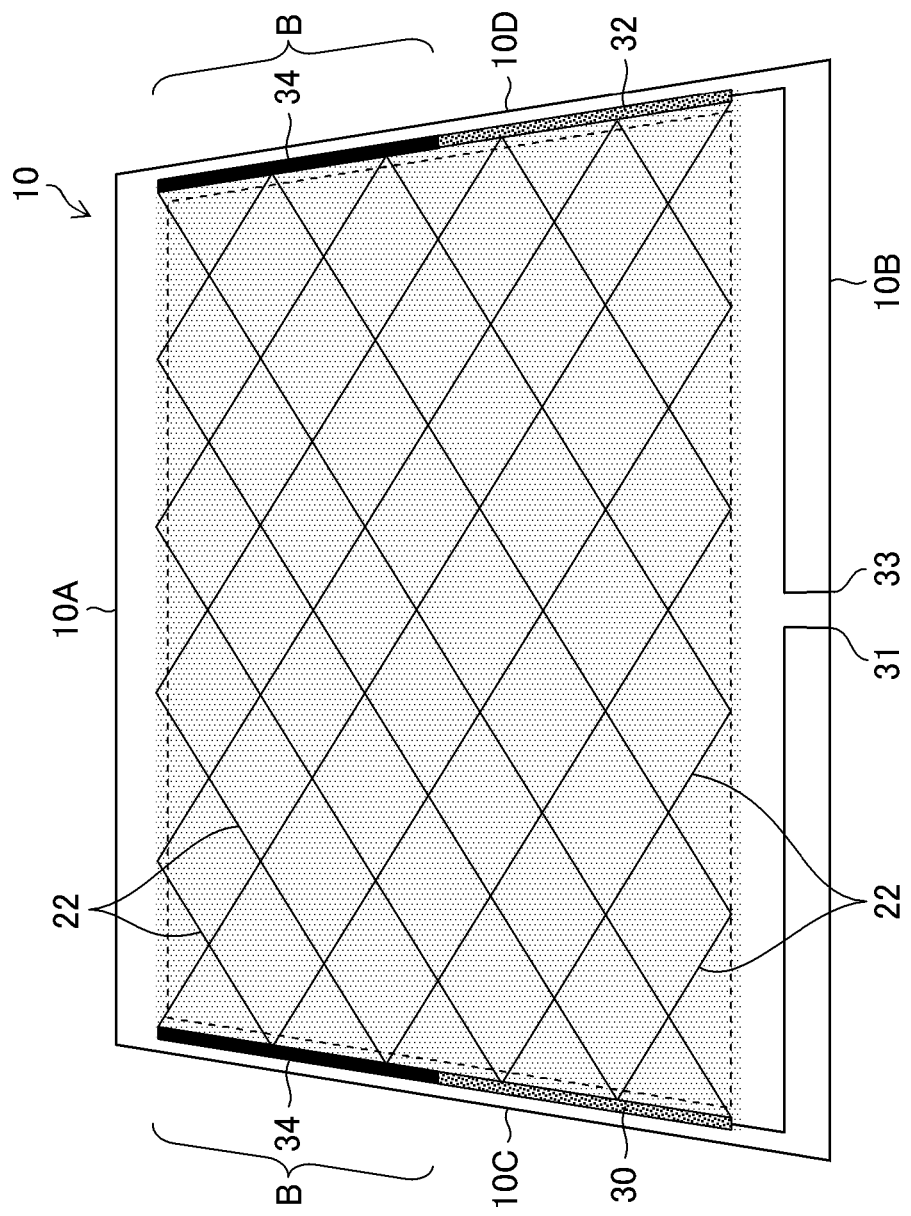
FIG. 4 is a front view of the laminated glass having third bus bars overlapped on parts of the first and second bus bars.

In the laminated glass 10 in FIG. 1 and FIG. 2, an example is shown wherein the third bus bar 34 is overlapped on each of the first bus bar 30 and the second bus bar 32, and the third bus bar 34 is overlapped in the entire region of the first bus bar 30 and the second bus bar 32, but the superimposing mode of the third bus bar 34 is not limited thereto. For example, it may be a mode wherein the third bus bar 34 is overlapped on at least a part of the region of at least one bus bar among the first bus bar 30 and the second bus bar 32. As a preferred example of such a mode, as shown in FIG. 4, the third bus bar 34 may be overlapped at a region B (a region where the influence of the heat generation loss due to the bus bar resistance becomes large) on the side far from the electrode taking-out portions 31, 33 for connection to an external electric power source, in the length direction of the first bus bar 30 and the second bus bar 32. Even in this mode, it is possible to make the resistance value of the first bus bar 30 and the second bus bar 32 to be effectively small. Accordingly, even in such a partially superimposing mode, it is possible to improve the heat generation efficiency of the electrically conductive heated material 22 as compared with laminated glass not provided with a third bus bar 34.

Further, the superimposing mode of the third bus bar 34 to the first bus bar 30 or the second bus bar 32, may be as overlapped completely, or may be as overlapped in a displaced state, in the mutual width direction. That is, at least a part of the third bus bar 34 may be overlapped on at least the first bus bar 30 or the second bus bar 32.

Further, according to the laminated glass in this embodiment, by using the third bus bar 34, it is possible to lower the heat generation temperature at the first bus bar 30 and the second bus bar 32, whereby it is possible to resolve a concern that the glass plates 12, 14 will be broken by the heat stress.

Now, examples of the respective components to constitute the laminated glass 10 will be described.

[Glass Plates 12, 14]

Glass plates 12, 14 to constitute the laminated glass 10 may be either inorganic glass or organic glass. As inorganic glass, for example, soda-lime glass, borosilicate glass, alkali-free glass, quartz glass, etc. may be used without any particular limitation. Among them, soda-lime glass is particularly preferred. The inorganic glass may be either non-tempered glass or tempered glass. Non-tempered glass is one obtained by molding molten glass in a plate shape, followed by annealing. Tempered glass is one having a compression stress layer formed at the surface of non-tempered glass. The tempered glass may be either physically tempered glass (such as air-cooling tempered glass) or chemically tempered glass. In the case of physically tempered glass, a glass plate uniformly heated in bending forming, may be quenched from a temperature in the vicinity of the softening point to let a compression stress formed at the glass surface by the temperature difference between the glass surface and the inside of the glass, thereby to temper the glass surface. In the case of chemically tempered glass, after the bending forming, a compression stress may be formed at the glass surface by e.g. an ion exchange method, thereby to temper the glass surface. Further, glass to absorb ultraviolet rays or infrared rays may be used, and further, although the glass is preferably transparent, it may be a glass plate colored to such an extent not to impair the transparency. On the other hand, as organic glass, a transparent resin such as polycarbonate may be mentioned. The shapes of the glass plates 12, 14 are not particularly limited, and may be shapes processed to various forms and curvatures. As the bending forming of the glass plates 12, 14, forming by weight or press forming may, for example, be used. Also the forming method of the glass plates 12, 14 is not particularly limited, but, for example, glass plates formed by e.g. a float process are preferred.

The thickness of the glass plates 12, 14 is preferably 1.5 mm or more and 2.3 mm or less, more preferably 1.7 mm or more and 2.0 mm or less. The respective thicknesses of the glass plates 12, 14 may be the same or different. In a case where the plate thicknesses of the glass plates 12, 14 are different from each other, it is preferred that the thickness of the glass plate located on the inside of the vehicle is thinner. In a case where the thickness of the glass plate located on the inside of the vehicle is thinner, it is possible to make the laminated glass to be sufficiently light in weight if the thickness of the glass plate located on the inside of the vehicle is 0.4 mm or more and 1.3 mm or less.

[Intermediate Layers 18, 20]

As the intermediate layers 18, 20, a thermoplastic resin is used in many cases. For example, thermoplastic resins which have heretofore been commonly used in applications of this type, such as a plasticized polyvinyl acetal resin, a plasticized polyvinyl chloride resin, a saturated polyester resin, a plasticized saturated polyester resin, a polyurethane resin, a plasticized polyurethane resin, an ethylene-vinyl acetate copolymer resin, an ethylene-ethyl acrylate copolymer resin, etc. may be mentioned. Further, a resin composition containing a modified block copolymer hydrate as disclosed in JP-A-2015-821 may also be preferably used.

The thickness of the intermediate layers 18, 20 is usually 0.05 or more mm and 2.28 mm or less, preferably 0.05 mm or more and 0.76 mm or less. Because, if too thick, the weight becomes heavy, and if too thin, the handling efficiency of the films tends to be poor. Further, the intermediate layers 18, 20 may be different from each other in thickness.

[Substrate 24]

As the substrate 24, a plastic film made of a polyester such as polyethylene terephthalate (PET), polyethylene naphthalate (PEN) etc., a homopolymer or copolymer such as polyamide, polyether, polysulfone, polyether sulfone (PES), polycarbonate, polyarylate, polyether imide, polyether ether ketone (PEEK), polyimide, aramid, etc., may be mentioned.

In a case where the above plastic film is used as the substrate 24, its thickness is usually 5 μm or more and 500 μm or less, preferably 10 μm or more and 200 μm or less, more preferably 50 μm or more and 150 μm or less. Because, if too thick, the followability to a curved surface tends to be low, and if too thin, the handling efficiency in production tends to be poor.

[Electrically Conductive Heated Material 22, First Bus Bar 30, Second Bus Bar 32]

The material for the electrically conductive heated material 22, the first bus bar 30 and the second bus bar 32 is not particularly limited, so long as it is an electrically conductive material, and, for example, a metal material may be mentioned. An example of the metal material may be gold, silver, copper, aluminum, tungsten, platinum, palladium, nickel, cobalt, titanium, iridium, zinc, magnesium or tin. Further, such metal may be processed by plating, or may be one made to be an alloy or a composite with a resin.

The method for forming the electrically conductive heated material 22, the first bus bar 30 and the second bus bar 32 to the substrate 24 may be an etching system such as photolithography, or a printing system such as screen printing, ink jet printing, off-set printing, flexo printing or gravure printing. By either method, it is possible to form the electrically conductive heated material 22, the first bus bar 30 and the second bus bar 32 by the same material integrally with the substrate 24.

Figure 5:
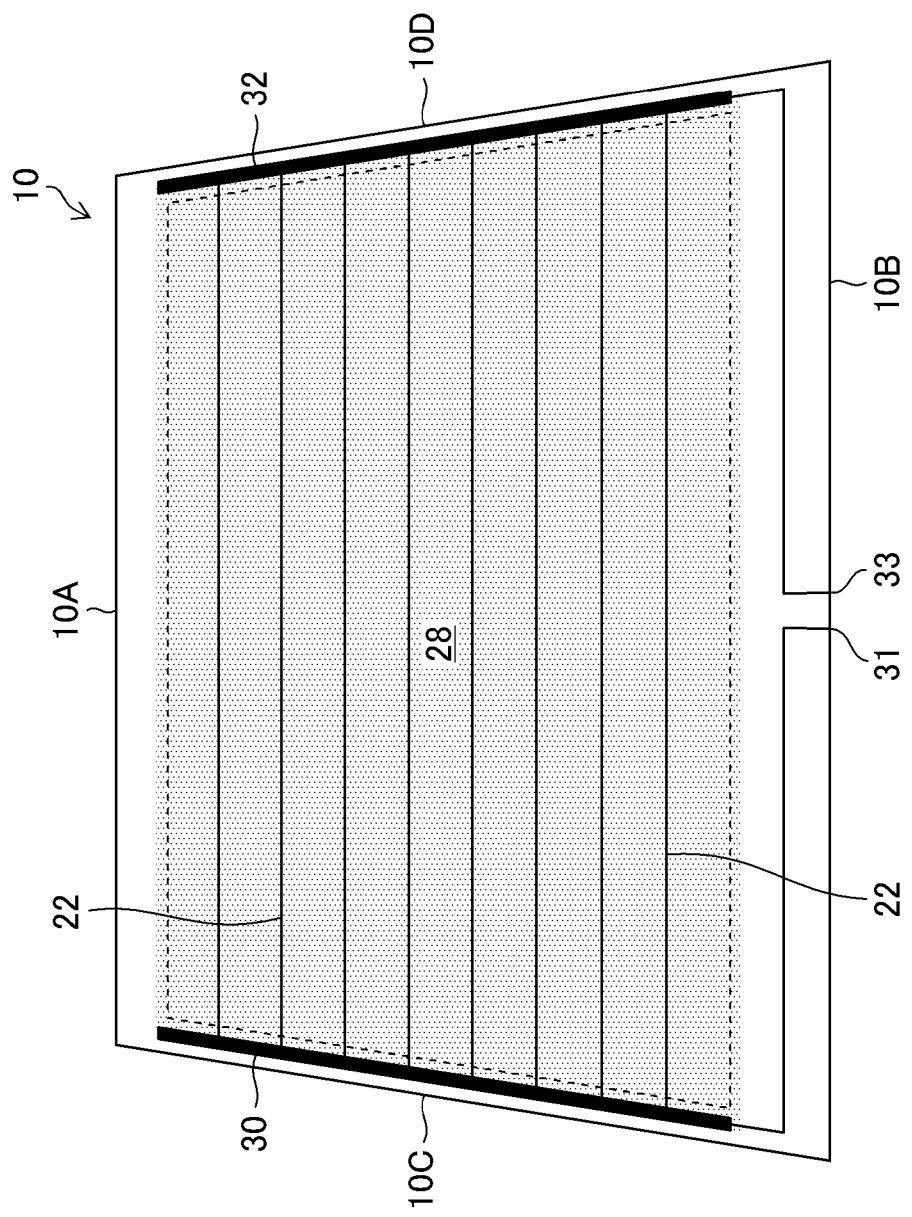
FIG. 5 is an illustrative view showing an example of a pattern of the electrically conductive heated material.

The electrically conductive heated material 22 is constituted by a plurality of linear materials, and the pattern to be formed by the plurality of linear materials may be a net-work form (a meshed form) as shown in FIG. 1, may be a straight line form as shown in FIG. 5, or may be a waved line form (such as a sin wave form or triangular wave form) not shown in the drawings.

Further, these electrically conductive heated material 22, first bus bar 30 and second bus bar 32 may be electrically conductive thin films of e.g. silver- or tin-doped indium oxide to be formed by a sputtering method. As the thin film-forming method, a PVD (physical vapor deposition) method such as vacuum vapor deposition or ion plating, or a CVD (chemical vapor deposition) method may also be preferably utilized. Otherwise, the electrically conductive thin film may be formed by using a wet coating method. Here, this transparent electrically conductive film may be formed over the entire surface of the see-through region 28, or may be formed at a part thereof.

The line width in the case where the electrically conductive heated material 22 is formed by linear materials, is usually preferably 25 μm or less, more preferably 20 μm or less, further preferably 16 μm or less. Because, as the line width becomes wider, the lines tend to be visible, such being an obstacle to the driver for driving.

The thickness of the electrically conductive heated material 22 is usually preferably 20 μm or less, more preferably 12 μm or less, further preferably 8 μm or less. Because, as the thickness becomes thicker, the area where light is reflected, tends to increase, and sun light or light of e.g. a head lump of an opposing car, tends to be reflected, such being an obstacle to the driver for driving.

Figure 6:
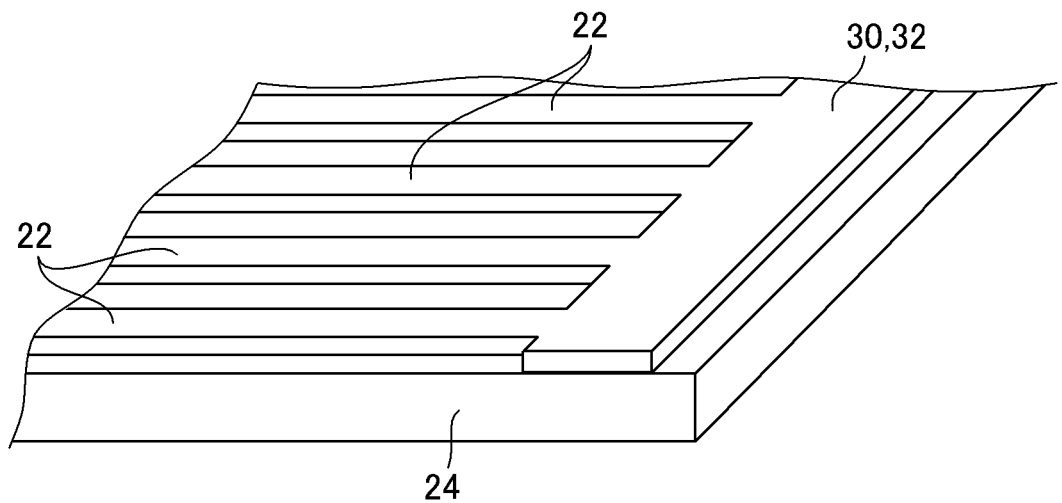
FIG. 6 is an illustrative view wherein the electrically conductive heated material, the first bus bar and the second bus bar are formed integrally to a substrate.

FIG. 6 is an illustrative view wherein the electrically conductive heated material 22, the first bus bar 30 and the second bus bar 32 are formed integrally to the substrate 24 by the above forming method. According to FIG. 6, it is shown that the electrically conductive heated material 22, the first bus bar 30 and the second bus bar 32 are an integrally-formed product formed by the same material to the substrate 24 in the mutually equal thickness. Here, the electrically conductive heated material 22, the first bus bar 30 and the second bus bar 32 may be different in the respective thicknesses. The width of the first bus bar 30 and the second bus bar 32 are usually 10 mm or less, but from the viewpoint of designability, it is desirably thin, preferably 6 mm or less, more preferably 4 mm or less.

[Third Bus Bar 34]

As the third bus bar 34, a copper ribbon or plain weave copper wires may be suitably used. To the copper ribbon or plain weave copper wires, a metal other than copper may be plated. For bonding of the third bus bar to at least the first bus bar 30 or the second bus bar 32, solder or at least one adhesive material among adhesive materials selected from electrically conductive adhesives (electrically conductive adhesive layers) may be used. Otherwise, the third bus bar 34 may be directly contacted to the first bus bar 30 or the second bus bar 32 without via the above solder or electrically conductive adhesive.

Further, the third bus bar 34 may be integrally formed on the substrate 24 by the same method as for the electrically conductive heated material 22, the first bus bar 30 and the second bus bar 32.

Further, as shown in FIG. 2, the thickness t3 of the third bus bar 34 is preferably thicker than the thickness t1 of the first bus bar 30 and the thickness t2 of the second bus bar 32. Preferably, the thickness t3 of the third bus bar 34 is 6 times or more of the thickness t1 of the first bus bar 30 and the thickness t2 of the second bus bar 32. It is thereby possible to effectively suppress the heat generation loss at the first bus bar 30 and the second bus bar 32.

Further, the width of the third bus bar 34 is usually 10 mm or less, but from the viewpoint of designability, it is desirably thin, preferably 6 mm or less, more preferably 4 mm or less. On the other hand, from the viewpoint of reducing the heat generation loss at the bus bars, the width of the third bus bar 34 is desirably thick. Thus, these conditions are in a contradictory relation to each other. In order to lower the heat generation loss at the bus bars while securing the designability by reducing the hiding width, it is effective to increase the thickness like in the present invention rather than the width of the bus bars.

Further, the respective thicknesses of the third bus bar 34, the first bus bar 30 and the second bus bar 32 are preferably in the following relation.

That is, X satisfying the formula (1) is preferably 3 or more, where A is the thickness of the first bus bar and the second bus bar, and B is the thickness of the third bus bar:

$$B = A \times X \qquad \text{Formula (1)}$$

Now, based on the following Table 1, Examples and Comparative Examples will be described.

Firstly, the construction of laminated glass as a prerequisite in Examples and Comparative Examples will be described.

[Size of the Heat Generation Region]

The heat generation region was set to be a rectangular shape of vertical 425 mm×horizontal 1,300 mm to simplify the calculation.

[Power Supply Direction]

Figure 11:
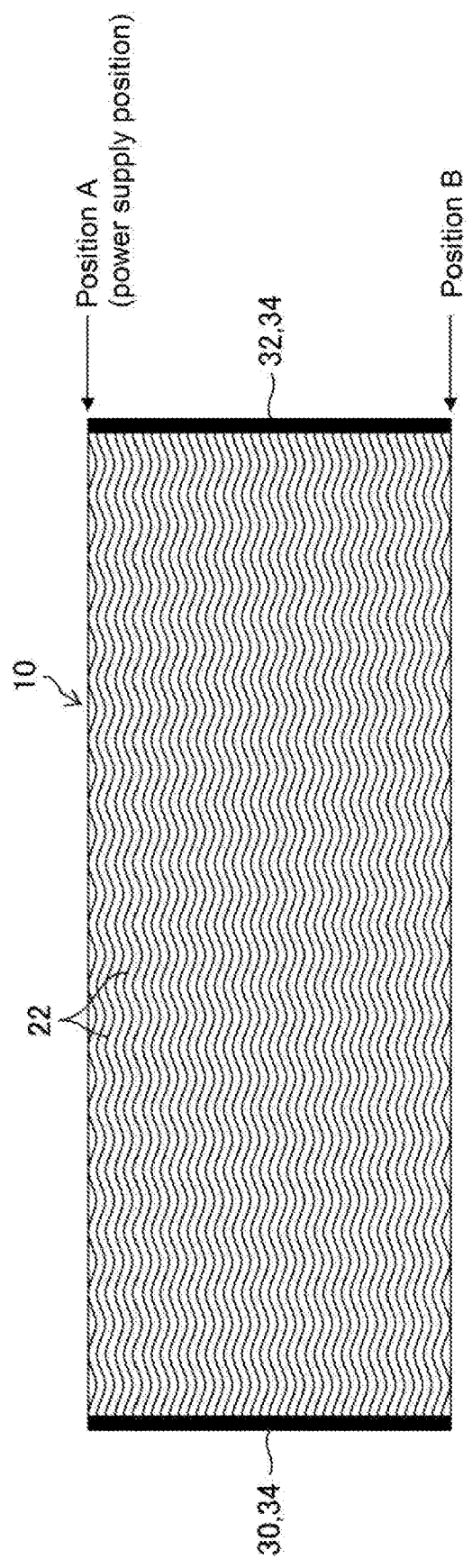
FIG. 11 is a schematic view of laminated glass showing the power supply direction.

Set to be a left and right direction. In this case, as in the schematic view of laminated glass 10 shown in FIG. 11, the power was supplied from position A at one end of the second bus bar 32, and the site most remote from the power supply portion (position A) was designated to be position B.

[Electrically Conductive Heated Material 22] A plurality of sin waves were arranged in parallel with a constant pitch of 2.1 mm. Specifically, they were made to be sin waves having a wave factor of 1.05 with a constant line diameter. Here, the wave factor represents the ratio in length along wave lines, of the wave lines arranged between the electrodes, to the distance between the electrodes.

[First to Third Bus Bars 30, 32, 34]

Width: 6 mm

Length: 425 mm

[Electrically Conductive Heated Material 22 and First to Second Bus Bars 30, 32 and 34]

Metal: copper

Thickness: 10 μm

[Other Prerequisite Conditions for Calculation]

Voltage: 12 V

Copper resistivity: 1.72 μΩcm

When the thickness of the first bus bar 30 and the second bus bar 32 is set to be A, the thickness B of the third bus bar is represented by B=A×X. That is, X=0 represents a case where the third bus bar 34 is not overlapped.

[Effects]

When the calorific value at position A is represented by $W_A$ [W/m²] and the calorific value at position B is represented by $W_B$ [W/m²], at position B, the calorific value is lowered by the resistance loss by the first bus bar 30 and the second bus bar 32, and therefore, X where the ratio in calorific value, $W_B/W_A$, becomes 90% and 95%, was calculated.

The heat generation distribution should better be less, and in this study, the calculation was made on such a basis that it is desirable that the above ratio in calorific value will be 90% or more, preferably 95% or more.

Comparative Example 1

In a case where the plurality of sin-wave line diameters of the electrically conductive heated material were set to be constant at 25 μm, and the third bus bar 34 was not applied, $W_B/W_A$ was 61%.

Examples 1, 2

In Comparative Example 1, when the thickness of the third bus bar 34 was made to be 4 times and 8 times, respectively, $W_B/W_A$ was 90% and 95%, respectively.

Comparative Example 2

In a case where the plurality of sin-wave line diameters of the electrically conductive heated material were set to be constant at 22 μm, and the third bus bar 34 was not applied, $W_B/W_A$ was 65%.

Examples 3, 4

In Comparative Example 2, when the thickness of the third bus bar 34 was made to be 3 times and 7 times, respectively, $W_B/W_A$ was 90% and 95%, respectively.

From these results, X is preferably 3 or more, more preferably 7 or more.

TABLE 1

| Examples | Comparative Examples | Line diameter [μm] | Calorific value $W_A$ at position A [W/m²] | Calorific value $W_B$ at position B [W/m²] | X | $W_B/W_A$ |
|---|---|---|---|---|---|---|
|  | 1 | 25 | 561 | 345 | 0 | 61% |
| 1 |  |  |  | 505 | 4 | 90% |
| 2 |  |  |  | 533 | 8 | 95% |
|  | 2 | 22 | 494 | 321 | 0 | 65% |
| 3 |  |  |  | 447 | 3 | 90% |
| 4 |  |  |  | 470 | 7 | 95% |

[Optically Shielding Portion 26]

As the optically shielding portion 26, as described above, a hiding layer formed by a black-colored ceramics printing ink may be exemplified. This optically shielding portion 26 is provided on an inside surface 11 of the glass plate 12. Further, the width of optically shielding portions 26C, 26D is larger than the width of the first bus bar 30 and the second bus bar 32. It is thereby possible to hide the first bus bar 30 and the second bus bar 32 by the optically shielding portions 26C, 26D when the laminated glass is viewed from the outside of the vehicle. Further, it is also preferred that the third bus bars 34 are likewise hidden by the optically shielding portions 26C, 26D. When the first bus bar 30, the second bus bar 32 and the third bus bars 34 are hidden by the optically shielding portions 26C, 26D, the first bus bar 30, the second bus bar 32 and the third bus bars 34 are hidden from the outside of the vehicle, whereby the designability of the outer appearance will not be impaired, such being preferred.

[Power Supply Direction]

In the laminated glass in FIG. 1 and FIG. 2, since the first bus bar 30 is arranged along the left end 24C of the substrate 24, and the second bus bar 32 is arranged along the right end 24D of the substrate 24, the power supply direction is a direction along the left and right direction in FIG. 1.

Figure 7:
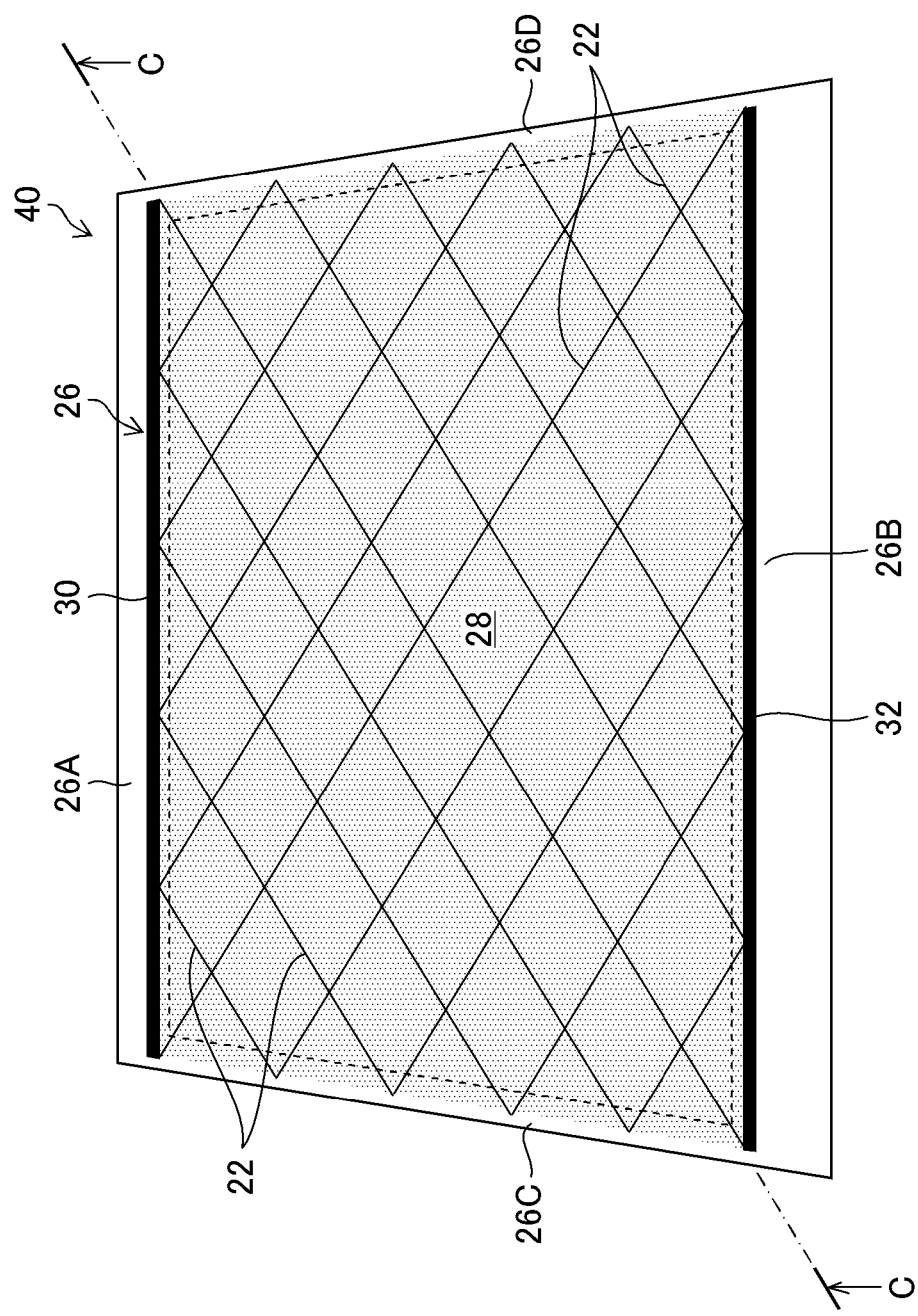
FIG. 7 is a front view of laminated glass in another embodiment.
Figure 8:
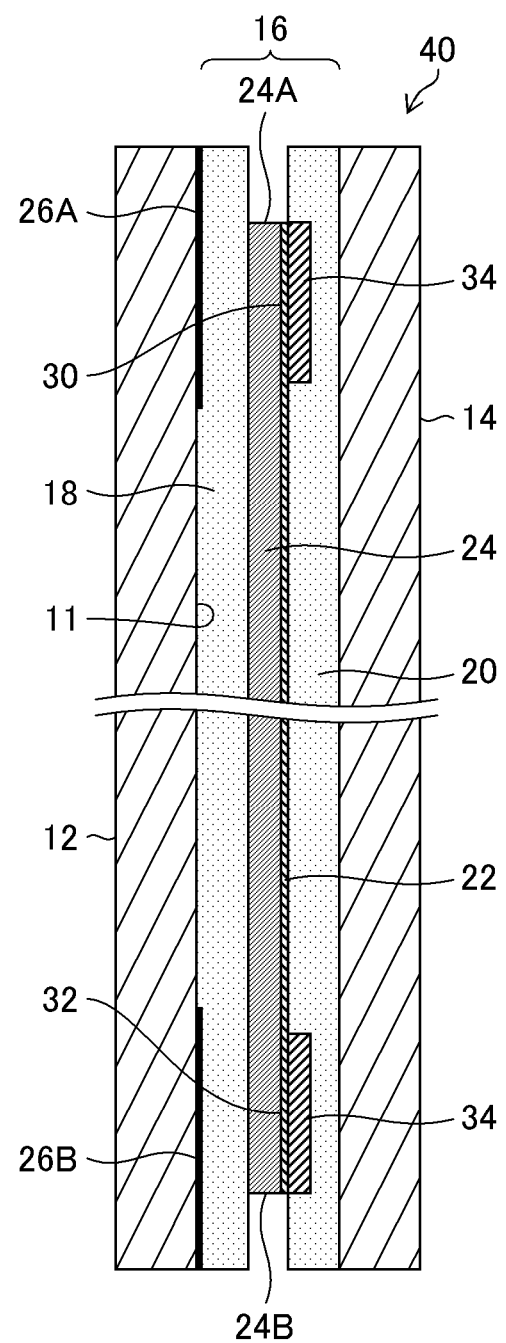
FIG. 8 is a cross-sectional view along line C-C of the laminated glass shown in FIG. 7.

Whereas, in the laminated glass 40 in another embodiment as shown in FIG. 7, as in the cross-sectional view in FIG. 8 along line C-C in FIG. 7, the first bus bar 30 is arranged along the upper end 24A of the substrate 24, and the second bus bar 32 is arranged along the lower end 24B of the substrate 24. Thus, the power supply direction in the laminated glass 40 in FIG. 7 and FIG. 8 is a direction along the up-and-down direction in FIG. 7 and FIG. 8. That is, the powder supply direction may be the left and right direction as in the laminated glass 10 shown in FIG. 1 and FIG. 2, or to may be the up-and-down direction as in the laminated glass 40 shown in FIG. 7 and FIG. 8.

As mentioned above, in the case of a common front glass, with a view to sufficiently securing the driving visual field, it is required to make the width of the left and right optically shielding portions 26C, 26D to be thinner than the width of the upper and lower optically shielding portions 26A, 26B. Therefore, if it is attempted to hide the bus bars by the left and right optically shielding portions 26C, 26D, it tends to be difficult to secure the width of the bus bars, whereby the resistance value of the bus bars tends to rise, and the heat generation loss tends to occur. Further, usually, in the front glass, the left and right direction is longer than the up-and-down direction. Under these circumstances, in the laminated glass 10 in FIG. 1 where the power is supplied in the left and right direction, as compared to the laminated glass 40 in FIG. 7 where the power is supplied in the up-and-down direction, it is desired that the electrically conductive heated material 22, the first bus bar 30 and the second bus bar 32 have a lower resistance. Accordingly, in consideration of such characteristics of the front glass, by applying the present invention so that the third bus bar 34 is overlapped on at least the first bus bar 30 or the second bus bar 32, it is possible to let the effects of the present invention be sufficiently exhibited.

In recent years, in the vicinity of the upper edge of the laminated glass 10, an on-vehicle camera or various sensors may be arranged in many cases. The on-vehicle camera or various sensors are attached at the vehicle inner side and adapted to receive and transmit an image or information in the travelling direction of the vehicle via the laminated glass 10. However, if an electrically conductive heated material 22 is present in front of the on-vehicle camera or various sensors, it may interfere with the image, signal, etc. which are received and transmitted by the on-vehicle camera or various sensors. Therefore, the substrate having the electrically conductive heated material 22 is required to be in such a shape that the electrically conductive heated material 22, the first bus bar 30, the second bus bar 32 and the third bus bar 34 are not present particularly at the site (the information transmitting portion) where the on-vehicle camera or various sensors are arranged, in the vicinity of the upper edge of the laminated glass 10. Further, in recent years, at the upper edge of the laminated glass 10, various antennas are attached in many cases, and in order to secure the communication performance, it is required to be in such a shape that the electrically conductive heated material 22, the first bus bar 30, the second bus bar 32 and the third bus bar 34 are not present at the antenna-arrangement area.

Figure 9:
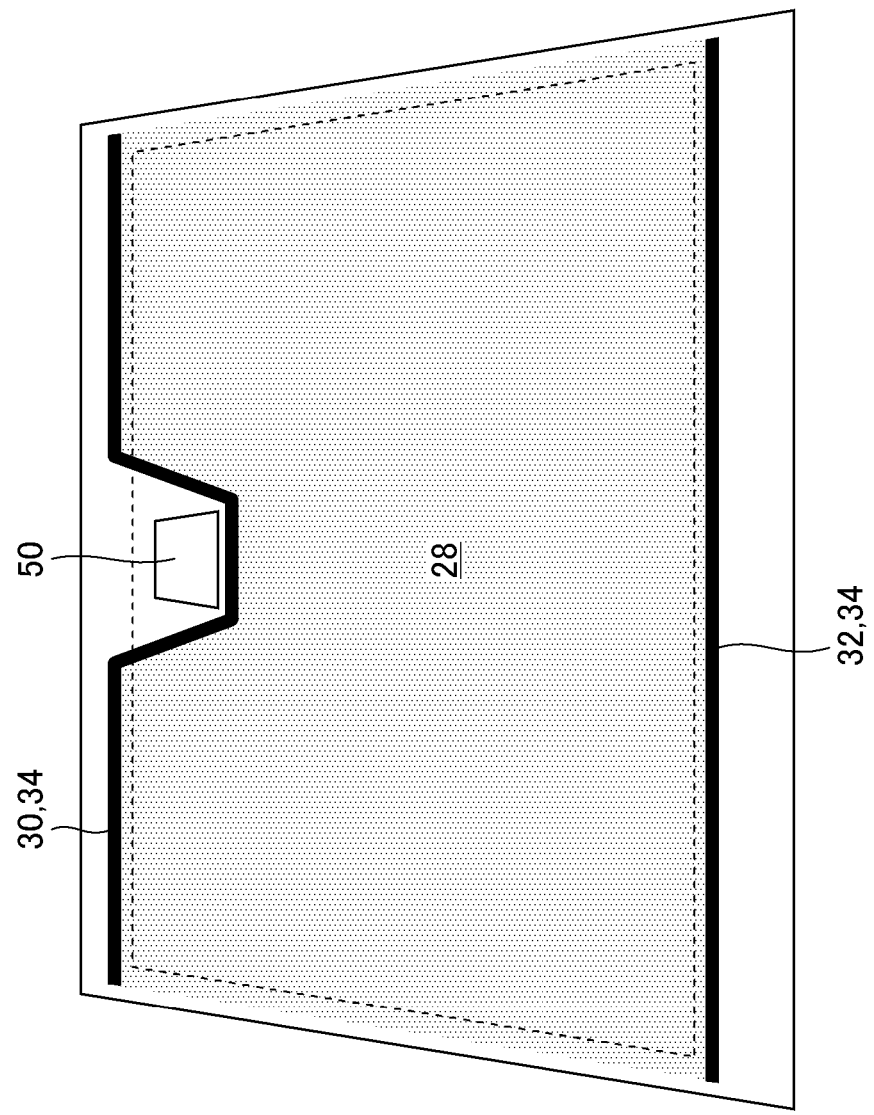
FIG. 9 is an illustrative view of laminated glass showing an example of a bus bar shape to bypass an information transmission portion.

In a case where the power supply direction is made to be the up-and-down direction, as shown in FIG. 9, the first bus bar 30 and the third bus bar 34 to be overlapped on the first bus bar 30 may be made to be in such a shape to detour around the lower side of the information transmitting portion 50 to bypass the information transmitting portion 50 trapezoidal in plan view. In FIG. 9, the third bus bar 34 is overlapped on the entire region of the first bus bar 30, but the mode may be such that the third bus bar 34 is overlapped on at least a part of the first bus bar 30. The same applies to the second bus bar 32.

Figure 10:
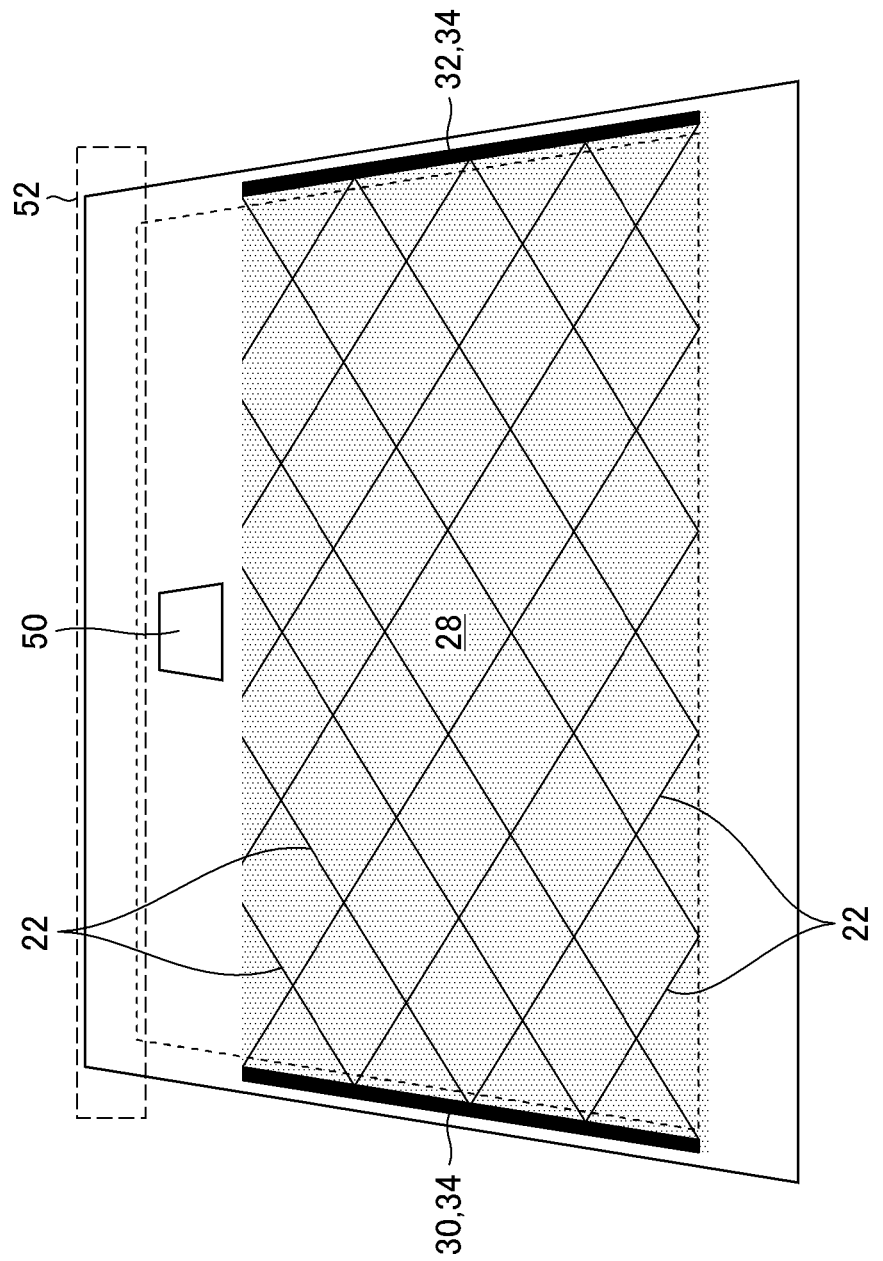
FIG. 10 is an illustrative view of laminated glass showing an example of a bus bar shape to bypass an information transmission portion and an antenna-arrangement area.

On the other hand, in a case where the power supply direction is made to be the left and right direction, as shown in FIG. 10, the electrically conductive heated material 22 may be formed without making it in a shape to detour around the information transmitting portion 50 or the antenna-arrangement area 52 rectangular in plan view, even when it is made to be in a shape not to present at the above-mentioned information transmitting portion 50.

[Method for Preparing Laminated Glass 10]

As the method for preparing the laminated glass 10, a common production method may be mentioned. For example, it is possible to employ a method in which the two glass plates 12, 14 and the intermediate material 16 are put in a vacuum bag and preliminarily bonded, followed by main bonding in an autoclave. The pressures and temperatures at the time of the preliminary bonding and main bonding are suitably set based on the thickness and material of the intermediate material 16, etc.

In the foregoing, the laminated glass of the present invention has been described with reference to the laminated glass 10 to be applied to front glass of an automobile. However, the application site of the laminated glass of the present invention is not limited to the front of a vehicle, and it may be applied to another site such as the rear, side, roof, etc.

Further, in the laminated glass 10 in the embodiment, as the intermediate layer, a pair of intermediate layers 18, 20 are exemplified, but as the intermediate layer, at least one intermediate layer among the intermediate layers 18, 20 may be provided. Further, in the laminated glass 10 in the embodiment, an electrically conductive heated material 22 is formed on one main surface of the substrate 24, but electrically conductive heated materials 22 may be formed on both surfaces of the substrate.

The present invention is not limited to the above-described embodiments and includes ones having various modifications and substitutions added to the above-described embodiments.

REFERENCE SYMBOLS

10: laminated glass, 11: inside surface, 10A: upper edge, 10B: lower edge, 10C: left edge, 10D: right edge, 12: glass plate, 14: glass plate, 16: intermediate material, 18: intermediate layer, 20: intermediate layer, 22: electrically conductive heated material, 24: substrate, 24A: upper end, 24B: lower end, 24C: left end, 24D: right end, 26: optically shielding portion, 26A: optically shielding portion, 26B: optically shielding portion, 26C: optically shielding portion, 26D: optically shielding portion, 28: see-through region, 30: first bus bar, 32: second bus bar, 34: third bus bar, 40: laminated glass, 50: information transmitting portion, 52: antenna-arrangement area.

What is claimed is:

1. Laminated glass comprising:
   a pair of glass plates facing each other;
   an intermediate layer located between the pair of glass plates and sandwiched between the pair of glass plates; and
   a substrate located between the pair of glass plates and having an electrically conductive heated material at least on one main surface; wherein:
   the substrate has a first end and a second end opposing the first end;
   a first bus bar, which is connected to the electrically conductive heated material, is arranged along the first end at the first end;
   a second bus bar, which is connected to the electrically conductive heated material, is arranged along the second end at the second end;
   and a third bus bar is arranged as overlapped on at least a part of the region of at least one bus bar among the first and second bus bars;
   wherein a thickness A of the first bus bar and the second bus bar and a thickness B of the third bus bar satisfies Formula (1):

$$B = A \times X \qquad \text{Formula (1)},$$

wherein X is 7 or greater, and,
   wherein the third bus bar is arranged as overlapped on at least a part of the region of at least one bus bar among the first and second bus bars which is located on an end of the first or second bus bar that is farthest from an electrode end of the first or second bus bar which is connected to an electrode, wherein the electrode is connected to an external power source.

2. The laminated glass according to claim 1, wherein the electrically conductive heated material, the first bus bar and the second bus bar are integrally formed of the same material to the substrate to form an integrally formed product.

3. The laminated glass according to claim 1, wherein the third bus bar is bonded to the first bus bar or the second bus bar via at least one bonding material selected from bonding materials including solder and an electrically conductive bonding material.

4. The laminated glass according to claim 1, wherein the third bus bar is directly contacted to the first bus bar or the second bus bar.

5. The laminated glass according to claim 1, which is provided with a pair of intermediate layers between the pair of glass plates, and the substrate is located between the pair of intermediate layers.

6. The laminated glass according to claim 1, which has a strip-shaped optically shielding portion to conceal the first bus bar, the second bus bar and the third bus bar, along the periphery of the glass plates.

7. The laminated glass according to claim 1, wherein the pair of glass plates respectively have left-edges and right-edges; and,
   the substrate is placed so that the first end is along the left-edges of the pair of glass plates and the second end is along the right-edges of the pair of glass plates.

8. The laminated glass according to claim 1, wherein the electrically conductive heated material is constituted by a plurality of linear materials.

9. The laminated glass according to claim 8, wherein the electrically conductive heated material is constituted in a net-work form by a plurality of linear materials.

10. The laminated glass according to claim 8, wherein a line width of the linear materials is 25 μm or less.

11. The laminated glass according to claim 1, wherein a thickness of the electrically conductive heated material is 20 µm or less.

12. The laminated glass according to claim 1, wherein the widths of the first bus bar, the second bus bar and the third bus bar are 10 mm or less.

13. The laminated glass according to claim 1, wherein the electrically conductive heated material, the first bus bar, the second bus bar and the third bus bar are made of either one material or alloy of gold, silver, copper, aluminum and tungsten.

14. Laminated glass comprising:
a pair of glass plates facing each other;
an intermediate layer located between the pair of glass plates and sandwiched between the pair of glass plates; and
a substrate located between the pair of glass plates and having an electrically conductive heated material at least on one main surface; wherein:
the substrate has a first end and a second end opposing the first end;
a first bus bar, which is connected to the electrically conductive heated material, is arranged along the first end at the first end;
a second bus bar, which is connected to the electrically conductive heated material, is arranged along the second end at the second end;
and a third bus bar is arranged as overlapped on at least a part of the region of at least one bus bar among the first and second bus bars; and
wherein the third bus bar is arranged as overlapped on at least a part of the region of at least one bus bar among the first and second bus bars which is located on an end of the first or second bus bar that is farthest from an electrode end of the first or second bus bar which is connected to an electrode, wherein the electrode is connected to an external power source.

15. The laminated glass according to claim 14, wherein the electrically conductive heated material, the first bus bar and the second bus bar are integrally formed of the same material to the substrate to form an integrally formed product.

16. The laminated glass according to claim 14, wherein the third bus bar is bonded to the first bus bar or the second bus bar via at least one bonding material selected from bonding materials including solder and an electrically conductive bonding material.

17. The laminated glass according to claim 14, wherein the third bus bar is directly contacted to the first bus bar or the second bus bar.

18. The laminated glass according to claim 14, which is provided with a pair of intermediate layers between the pair of glass plates, and the substrate is located between the pair of intermediate layers.

19. The laminated glass according to claim 14, which has a strip-shaped optically shielding portion to conceal the first bus bar, the second bus bar and the third bus bar, along the periphery of the glass plates.

* * * * *